G. W. DELLINGER.
Middlings-Purfiers.

No. 148,876. Patented March 24, 1874.

WITNESSES:
E. Wolff
D. Sedgwick

INVENTOR:
G. W. Dellinger
BY Munn & Co.
ATTORNEYS.

UNITED STATES PATENT OFFICE.

GEORGE W. DELLINGER, OF RIPON, WISCONSIN.

IMPROVEMENT IN MIDDLINGS-PURIFIERS.

Specification forming part of Letters Patent No. 148,876, dated March 24, 1874; application filed December 13, 1873.

*To all whom it may concern:*

Be it known that I, GEORGE W. DELLINGER, of Ripon, in the county of Fond du Lac and State of Wisconsin, have invented new and Improved Flour and Middlings Purifiers, of which the following is a specification:

The invention will first be fully described, and then pointed out in the claim.

Figure 1:
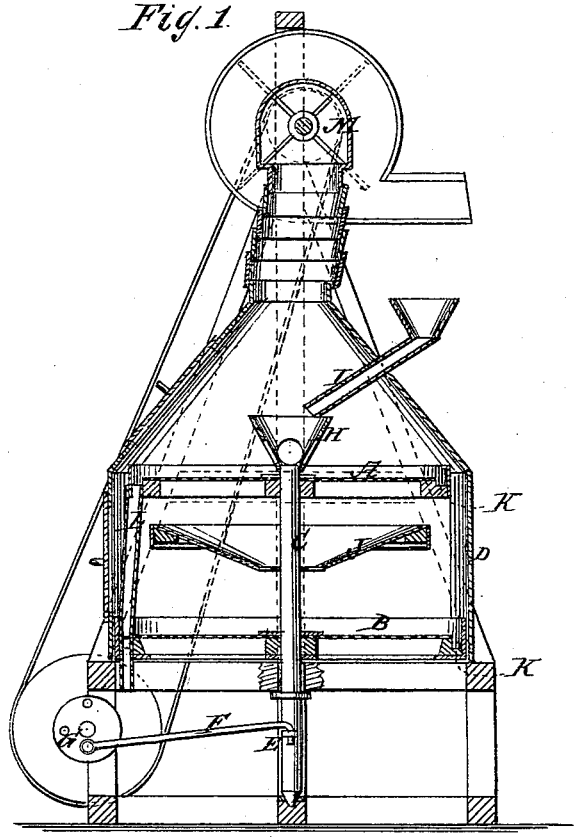
Figure 2:
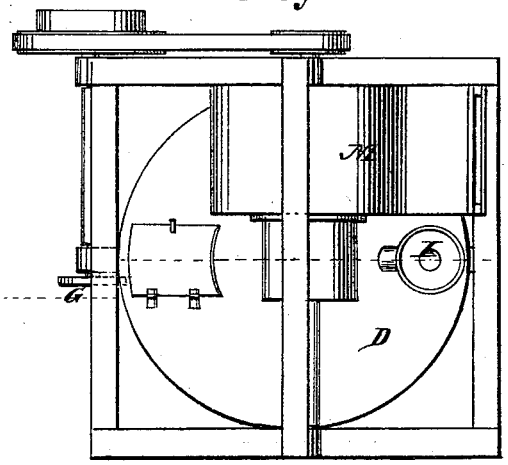

Figure 1 is a sectional elevation of my improved apparatus, and Fig. 2 is a top view.

Similar letters of reference indicate corresponding parts.

A and B represent a couple of circular horizontal sieves, screens, or bolts, arranged one above another, on a vertical shaft, C, within a suitable case, D, for screening, sifting, or bolting the flour or middlings to be treated by a quick forward-and-backward oscillating motion, imparted by the arm E, connecting-rod F, and crank-shaft G, or any other suitable means, the said flour or middlings being discharged upon the upper screen or sieve at the center, say from a hopper, H, into which it is discharged by a spout, I. The flour or middlings, falling through the sieve, drops onto the flat funnel J, to be delivered upon the center of the lower sieve by passing through its central hole, while the coarse matters, not passing through the sieve, escape off the periphery into the little annular trough K, in which they are conducted to the delivery-spout L. The lower sieve is finer than the upper one, but is the same in other respects, and delivers the coarse matters which do not pass through it by its annular trough K to the discharge-spout. Above the screens the case is funnel-shaped, and terminates at a fan, M, by which the dust and light matters are sucked up from the space below, and delivered. The upper sieve is a little smaller than the lower one, to afford ample space for the air loaded with the particles from below to pass up.

These screens will be self-cleaning, in consequence of the lively action of the flour or middlings on them, and thus the brushes, knockers, &c., used with ordinary middlings-cleaners and bolts will not be needed.

The power needed for driving the machine will be greatly lessened in consequence of the whole weight of the screens or sieves being borne on the step of the upright shaft.

Having thus described my invention, I claim as new and desire to secure by Letters Patent—

The combination, with the suction-fan M and case K, of the two oscillating sieves A B, the top one made smaller than the lower one, to allow the upward passage of light particles of matter from the lower sieve, as set forth.

GEORGE W. DELLINGER.

Witnesses:
   S. E. REED,
   E. MAPES.